United States Patent
Johnston et al.

(10) Patent No.: US 8,205,461 B2
(45) Date of Patent: Jun. 26, 2012

(54) METHOD AND SYSTEM FOR DETECTING LOW REFRIGERANT CHARGE AND AIR CONDITIONER PROTECTION SYSTEM

(75) Inventors: William Stewart Johnston, South Lyon, MI (US); David Alan Wong, Southfield, MI (US); Hugh Hamilton, Troy, MI (US); Manfred Koberstein, Troy, MI (US); Debasish Dhar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 736 days.

(21) Appl. No.: 12/359,561

(22) Filed: Jan. 26, 2009

(65) Prior Publication Data

US 2010/0186430 A1 Jul. 29, 2010

(51) Int. Cl.
*F25B 45/00* (2006.01)
(52) U.S. Cl. .................. 62/77; 62/125; 62/127; 62/139; 62/133; 62/149
(58) Field of Classification Search .............. 62/77, 125, 62/127, 129, 133, 149
See application file for complete search history.

(56) References Cited

U.S. PATENT DOCUMENTS

| | | | |
|---|---|---|---|
| 5,201,862 A | 4/1993 | Pettitt | |
| 5,251,453 A | 10/1993 | Stanke et al. | |
| 5,457,965 A | 10/1995 | Blair et al. | |
| 5,469,947 A * | 11/1995 | Anzai et al. ................. | 192/21.5 |
| 5,481,884 A | 1/1996 | Scoccia | |
| 6,460,354 B2 | 10/2002 | Yabuki et al. | |
| 6,672,085 B1 * | 1/2004 | Sangwan et al. ............... | 62/133 |
| 6,725,676 B2 * | 4/2004 | Takano et al. .................. | 62/126 |
| 7,337,619 B2 | 3/2008 | Hsieh et al. | |
| 2001/0025500 A1 * | 10/2001 | Bascobert ...................... | 62/217 |

FOREIGN PATENT DOCUMENTS

KR  20040041432  5/2004

* cited by examiner

*Primary Examiner* — Cheryl J Tyler
*Assistant Examiner* — Orlando E Aviles Bosques
(74) *Attorney, Agent, or Firm* — Raymond L. Coppiellie; Brooks Kushman P.C.

(57) ABSTRACT

A method and system for detecting a low charge condition in an air conditioner for a vehicle. The system first determines whether noise factors are present that would interfere with reliably measuring a pressure delta. If noise factors are not present, the system determines a pressure delta value for the compressor by comparing the high side pressure when the clutch is engaged to a high side pressure when the clutch is disengaged. If the pressure delta value is less than a threshold value, a low charge condition may be recorded. When the number of low charge conditions detected exceeds a predetermined number of events, the system may set a temperature diagnostic trouble code, disable the air conditioning system and alert the driver of a potential problem.

14 Claims, 1 Drawing Sheet

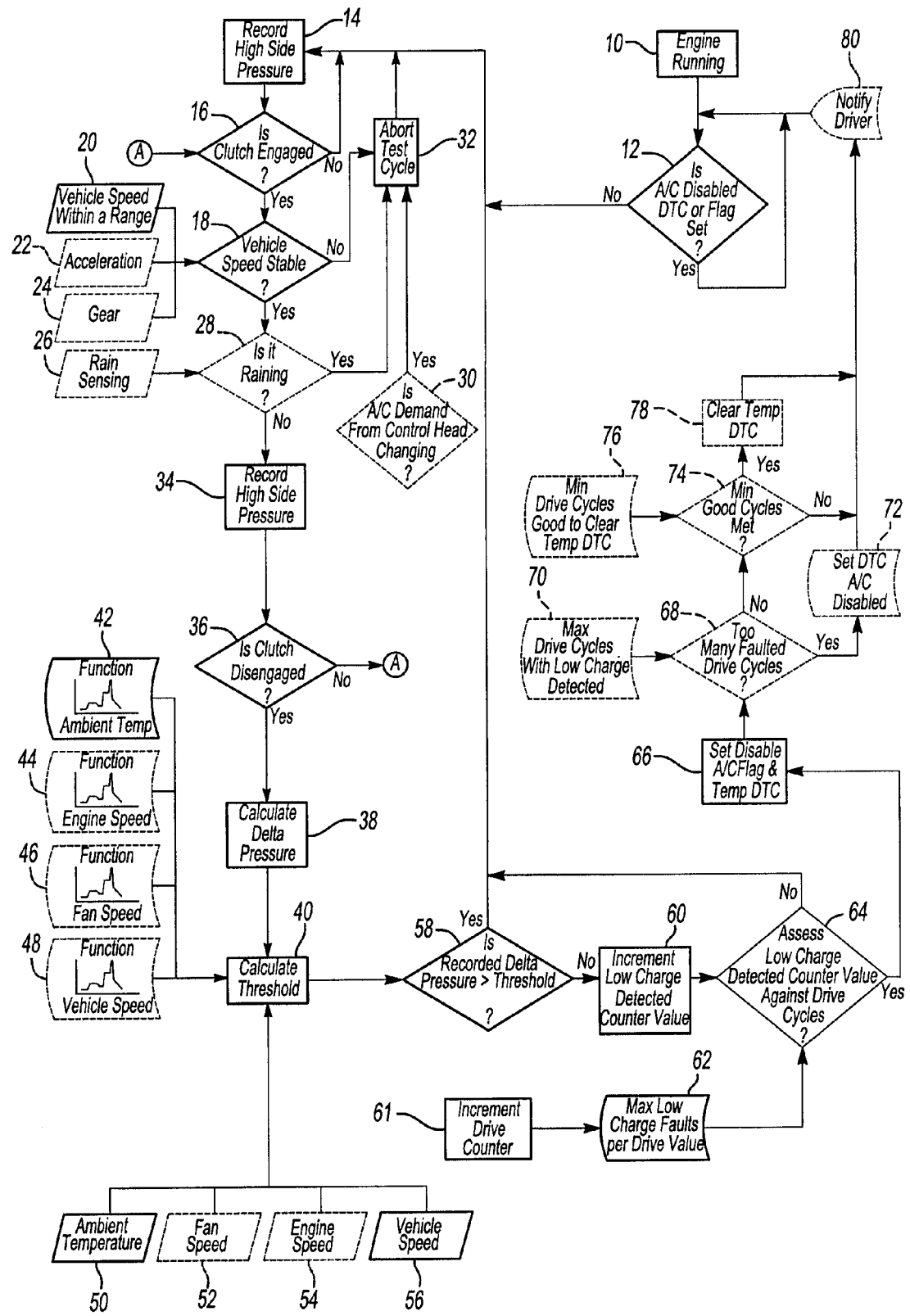

METHOD AND SYSTEM FOR DETECTING LOW REFRIGERANT CHARGE AND AIR CONDITIONER PROTECTION SYSTEM

BACKGROUND OF THE INVENTION

1. Field of the Invention

The present invention relates to a method and system for detecting whether the refrigerant charge level in an air conditioning system for a vehicle is low in a system utilizing on-board computer software and existing sensor inputs.

2. Background Art

Vehicle air conditioning systems circulate refrigerant through a closed-loop circulation system including a compressor, a heat exchanger and an expansion device. The performance of an air conditioning system degrades if the air conditioning system loses a significant portion of a refrigerant charge volume. If a significant portion of the refrigerant charge is lost, the air conditioning system may fail.

Loss of refrigerant reduces the amount of oil circulating in the system. If the loss of refrigerant is substantial, the compressor may be starved of oil which can lead to compressor failure. A loss of refrigerant can also cause the compressor to pull the air conditioning system into a vacuum which also starves the compressor of oil. If the compressor continues running in a starved condition, the compressor will eventually fail.

After compressor failure, it is expensive to replace the compressor and repair other damaged components of the air conditioning system. In contrast, if a loss of refrigerant is detected before damaging the compressor, the cost of repairing an air conditioning system that has a slow leak is a fraction of the cost of replacing a failed compressor. Most vehicle drivers are not able to determine whether an air conditioning system has a low charge until the air conditioner fails.

It has been proposed to add multiple pressure and temperature sensors throughout the air conditioning system to provide a low A/C charge detection system. However, the cost of adding additional pressure and temperature sensors in the air conditioning system is difficult to justify. There is a need for a low charge detection strategy that does not require adding pressure and temperature sensors throughout the air conditioning system. There is also a need for a low charge detection system that is capable of detecting a small loss of refrigerant before any damage is done to the compressor.

These and other problems are addressed by Applicants' system and method as summarized below.

SUMMARY OF THE INVENTION

Air conditioning systems are generally provided with a conventional sensor set including evaporator core thermistors, high pressure transducers, and pressure switches. The conventional sensor set is subject to noise in the system and is not capable of reliably making an accurate determination that the system is low on charge. A software solution is proposed that can be used with the conventional sensor set that is used to control air conditioning functions. Other common vehicle status indicators and sensors are used to filter the noise factors that previously precluded making an accurate determination that the system is low on charge with the conventional sensor set.

Software algorithms that receive inputs from common vehicle status indicators and sensors are used to determine whether the air conditioning system is operating with sufficient stability to permit the conventional sensor set to provide a reliable indication of system charge status. Whether the air conditioning system is operating at a relatively steady state, may be indicated by one or more of the following factors, vehicle speed, engine rpm, vehicle acceleration, fan speed, the presence of precipitation, air conditioning control command changes, and the like. Otherwise, the conventional sensor set can result in false indications of a low air conditioning charge level and provide unreliable indications.

The powertrain control module may host software for monitoring the air conditioning charge conveniently because it is already provided with sensor signals and other vehicle status indicators. Alternatively, the software for monitoring the air conditioner charge level may be hosted by the HVAC climate control module or other processing units.

According to the method proposed, it is first determined if the vehicle is operating a stable state. The characteristics of the required stable state are predefined and may be calibrated depending on various vehicle operating parameters. The stable state may be indicated based upon vehicle speed, engine rpm, vehicle acceleration, and the like. Once it is determined that the vehicle is operating at a predefined stable state, it is determined if the air conditioning system is cycling with the air conditioning system going on and off to meet demand. Next, the system may determine if it is raining by testing the status of the wipers or the status of a precipitation sensor in which case the air conditioning charge state test routine may be bypassed. As used herein, a wiper actuation indicator should be understood to be one type of a moisture sensor. Bypassing the air conditioning charge state test routine during periods of precipitation is necessary because the efficiency and performance of the condenser in the air conditioning system may result in a false indication of a low air conditioning charge.

If it is determined that the vehicle is operating in the steady-state and no precipitation is present, data samples are taken from the high side pressure transducer during a complete air conditioning system compressor cycle (the compressor turns on and off). The difference between the high side pressure with the clutch engaged and the high side pressure with the clutch disengaged during the compressor cycle is calculated to provide a pressure delta. The pressure delta is then compared to a threshold, or cutoff value. The threshold, or cutoff value, is a calibrated value based upon engine rpm, vehicle speed, ambient temperature, and other internal variables that are provided to the powertrain control module, or alternatively, the HVAC control module or other processing unit.

A single instance of exceeding the threshold value is not normally considered sufficiently reliable to indicate a low air conditioning charge level. Instead, a predetermined number of air conditioning cycles are monitored during a driving event. When a predetermined number of low charge indications are recorded, the air conditioning system is shut off and a diagnostic trouble code is recorded in the system memory. If a number of bad drive events are recorded, the system may disable the air conditioning system until service of the air conditioning system is performed. An indicator light or other warning signal may be provided to advise the driver of the vehicle of the need to service the air conditioning system.

These and other aspects of the present invention will be better understood in view of the attached drawings and the following description of the illustrated embodiment.

BRIEF DESCRIPTION OF THE DRAWINGS

FIG. 1 is a flowchart of a system that implements a method of detecting a low charge condition in an air conditioning system for a vehicle.

DETAILED DESCRIPTION OF THE PREFERRED EMBODIMENT(S)

Referring to FIG. 1, a flowchart of the method and system of an illustrated embodiment of the present invention is shown. Other embodiments of the invention may be developed that can achieve the objective of detecting a low charge condition in an air conditioning system for a vehicle that uses software that utilizes existing air conditioning system sensor inputs.

In one embodiment, a vehicle engine is running as in block 10. The system begins by checking to determine at 12 if the air conditioning system is disabled, if a diagnostic trouble code (DTC) is present, or whether a flag has been set previously by the system. The system records at 14 the high side pressure within the air conditioning system. Once the high side pressure is recorded at 14, the system determines whether the air conditioning clutch is engaged at 16. If not, the system returns to 14 to again record the high side pressure.

If the clutch is engaged at 16, the system determines whether the vehicle speed is sufficiently stable to permit completion of the test cycle. Whether the vehicle speed is sufficiently stable is determined by reviewing at least the vehicle input information at 20. As used herein the term "stable speed" is defined as any constant speed greater than a preset threshold speed value above which the air conditioning system and/or vehicle are in stable operation. Alternatively, the system may determine whether or not the vehicle is accelerating at 22 or may also determine at 24 whether the transmission is in the proper gear for stable operation. A switch, sensor, or data input may be used to determine a gear selection position and such inputs are collectively referred to as a gear selection position indicator. If it is determined that the vehicle is stable, the system may obtain an input from a rain sensor 26 or wiper status signal, and determine at 28 whether it is raining. If it is determined at 28 that it is not raining, then the test is permitted to continue.

If it is determined at 18 that the vehicle speed is not stable or that it is raining at 28, the system may then abort the test cycle at 32. If it is determined at 30 that the air conditioning demand from the control head is changing due to controls being adjusted, for example, if a child is playing with the air conditioning control and switching them on and off rapidly, the system may also abort the test cycle at 32 to prevent inaccurate results. If the test cycle is aborted at 32, the system returns to the beginning of the test cycle at 14.

The system continues to loop until it is determined that the air conditioning clutch is engaged at 16, the vehicle speed is stable at 18, and it is not raining at 28. If so, the system again records the high side pressure at 34. The system then determines again whether the clutch is disengaged at 36. If so, the system measures the final high side pressure and proceeds to calculate the delta pressure at 38. If the clutch is not disengaged at 36, the system returns to the clutch engaged decision block at 16 as indicated by "A". The calculated delta pressure is then supplied to a comparison function that calculates a threshold at 40. The threshold delta pressure may be determined based upon reference to an algorithm or look-up table for reference values of ambient temperature provided at 42, engine speed provided at 44, fan speed provided at 46, or vehicle speed provided at 48. At a minimum, the system requires determining what the appropriate ambient temperature should be at 42. The determination of the engine speed 44, the fan speed 46, and vehicle speed 48 are alternative or additional parameters that may be utilized in different embodiments of the invention. The actual ambient temperature or sensed ambient temperature is provided at 50. Alternatively, the temperature may be inferred by an algorithm that uses other sensor inputs. In addition, the fan speed may be provided at 52 and engine speed may be provided at 54 from sensors in the engine. The invention may be practical without reference to the fan speed variable 52 and engine speed variable 54. However, vehicle speed should be provided at 56 from a vehicle speed sensor. The delta pressure may then be calculated with the sensor inputs of ambient temperature 50, fan speed 52, engine speed 54 and vehicle speed 56 and to look-up tables that are provided for each variable, including reference values for ambient temperature at 42, engine speed function at 44, fan speed function at 46, and vehicle speed function at 48.

Decision block 58 determines whether the delta pressure value is greater than the calculated threshold pressure. If so, the system verifies that the pressure in the air conditioning system is greater than the threshold which is an indication that the system is functioning properly. If the recorded pressure delta is not greater than the threshold, a low charge counter is incremented at 60 indicating that a low charge event has been detected.

A predetermined number of low charge events counted at 60 is compared at 64 to a maximum low charge faults per drive value 62 that is based upon a drive cycle counter that is incremented at 61 each time the vehicle is driven. The maximum low charge faults per drive value is determined by reference to a look-up table or calibration setting for the system. The maximum low charge fault per drive value is compared to the incremented low charge counter to determine at 64 whether too many faults have occurred. If too many faults have not occurred, the system returns again to the beginning at recording high side pressure at 14. If too many faults have occurred, the system then sets a disable AC flag and a temperature diagnostic trouble code at 66 is set in the engine control module.

The system may then compare a value for the maximum number of drive cycles with a low charge detected function at 70. If the system determines at 68 that there were too many faulted drive cycles as compared to a calibrated value, then the system may set the temperature diagnostic trouble code and disable the air conditioner at 72. If the maximum number of drive cycles with low charge are detected has not been met, the system determines at 74 whether a minimum number of cycles have been met by comparing to a preset number of minimum good drive cycles 76. If the number of good drive cycles exceeds the preset number, a previously set temperature diagnostic trouble code may be cleared at 78.

If, for example, a low charge condition is detected sporadically, but on most cycles the system indicates that it is operating properly, the system can clear the temperature diagnostic trouble code at 78. Repeated readings of acceptable charge levels indicate that the air conditioning system is operating properly and that the pressure in the air conditioner is appropriate for continued operation of the air conditioner. After a predetermined number of good drive cycles are set as a calibration value, the system will permit the temperature diagnostic trouble code to be cleared.

After the temperature diagnostic code is cleared, the driver may be notified at 80 to avoid unnecessary service of the air conditioning system. Once the driver is notified, the system returns to its beginning state and continues to monitor the operation of the system by again first determining whether the air conditioner is disabled or if the temperature diagnostic trouble code or flag is set at 12.

While the best mode for carrying out the invention has been described in detail, those familiar with the art to which this invention relates will recognize various alternative designs and embodiments for practicing the invention as defined by the following claims.

What is claimed:

1. A method of detecting a low charge condition in an air conditioning system for a vehicle in a test cycle, the method comprising:
   verifying whether the vehicle is operating at a speed within a range and, if not, aborting the test cycle;
   verifying that an ambient temperature is within a predetermined range;
   determining a pressure differential value for a compressor of the air conditioning system by comparing a high side pressure in the air conditioning system when a clutch for the compressor is engaged to a high side pressure in the air conditioning system when the clutch for the compressor is disengaged;
   assessing the pressure differential value against a threshold value;
   incrementing a low charge detected counter value if the pressure differential value is less than the threshold value; and
   assessing the low charge detected counter value against a value for each time the vehicle is driven with excessive low charge events.

2. The method of claim 1 further comprising verifying that a fan speed is within a predetermined range.

3. The method of claim 1 further comprising sensing the presence of precipitation and, if precipitation is sensed, aborting the test cycle.

4. The method of claim 1 further comprising determining a rate of vehicle acceleration as a part of verifying an operation state of the vehicle.

5. The method of claim 1 further comprising determining a gear selection condition as a part of verifying an operation state of the vehicle.

6. The method of claim 1 further comprising determining whether an air conditioning control command is being changed and, if so, aborting the test cycle.

7. The method of claim 1 further comprising setting a disable air conditioning flag and temperature diagnostic trouble code in a vehicle diagnostic system when the number of drive cycles with excessive low charge events exceeds a predetermined number.

8. The method of claim 1 further comprising incrementing a drive counter value each time the vehicle is driven.

9. The method of claim 8 further comprising comparing the low charge detected counter value to a maximum low charge fault per drive value and setting a disable air conditioning flag and a temperature diagnostic trouble code in a vehicle diagnostic system.

10. The method of claim 9 further comprising incrementing a drive cycle counter each time a test cycle is performed and assessing the number of drive cycles against the low charge detected counter value and determining whether a minimum number of good drive cycles has been met to clear the temperature diagnostic trouble code.

11. The method of claim 1 further comprising providing a perceptible message to a driver of the vehicle of a low charge condition.

12. A system for detecting a low charge condition in an air conditioner for a vehicle in a test cycle, the system comprising:
   a vehicle speed sensor that determines whether the vehicle is operating at a speed within a range and, if not, aborting the test cycle;
   a temperature sensor or an algorithm that determines whether an ambient temperature is within a predetermined range;
   a pressure sensor that determines a pressure value for a refrigerant of the air conditioning system by comparing a high side pressure in the air conditioning system when a clutch for the compressor is engaged to a high side pressure in the air conditioning system when the clutch for the compressor is disengaged;
   a controller that assesses the pressure differential value against a threshold value;
   a low charge detected counter that increments a low charge value each time the pressure differential value is less than the threshold value; and
   a drive counter that increments a drive counter value each time the vehicle is driven, the controller comparing the drive counter value to the low charge value and to a predetermined value and setting a diagnostic trouble code in a vehicle diagnostic system, and wherein when the diagnostic trouble code is set, the controller determines whether a minimum number of good drive cycles has been met to clear the temperature diagnostic trouble code.

13. The system of claim 12 further comprising a moisture sensor that senses the presence of moisture, wherein the test cycle is aborted when moisture is sensed.

14. The system of claim 12 wherein the vehicle speed sensor further comprises a gear selection position indicator that provides an input signal to the controller that is used to verify an operation state of the vehicle.

* * * * *